United States Patent [19]

McKiel, Jr.

[11] Patent Number: 5,374,924
[45] Date of Patent: Dec. 20, 1994

[54] COMPUTER USER INTERFACE WITH STEREO AND FILTERED SOUND EFFECTS

[75] Inventor: Frank A. McKiel, Jr., Dallas, Tex.

[73] Assignee: International Business Machines Corporation, Armonk, N.Y.

[21] Appl. No.: 22,788

[22] Filed: Feb. 23, 1993

Related U.S. Application Data

[63] Continuation of Ser. No. 746,840, Aug. 19, 1991, abandoned.

[51] Int. Cl.$^5$ .............................................. H04Q 1/00
[52] U.S. Cl. ................................. 340/825.19; 341/21; 434/114
[58] Field of Search ............... 340/825.19, 407.1, 706, 340/709, 710, 721; 341/21; 434/112, 116; 345/157; 395/157; 273/85 G

[56] References Cited

U.S. PATENT DOCUMENTS

| | | | |
|---|---|---|---|
| 3,800,082 | 3/1974 | Fish | 434/116 |
| 4,281,833 | 8/1981 | Sandler et al. | 273/85 G |
| 4,322,744 | 3/1982 | Stanton | 434/116 |
| 4,868,549 | 9/1989 | Affinito et al. | 340/710 |
| 4,875,185 | 10/1989 | Bornschein | 340/825.19 |

FOREIGN PATENT DOCUMENTS 3942093  5/1990  Germany ...................... A61F 9/08

OTHER PUBLICATIONS

Seeing Eye Mouse, IBM Technical Disclosure Bulletin, vol. 28, No. 3, Aug. 1985.
Affinits, et al, Braille Computer Mouse with Tactile Position Feedback IBM Technical Disclosure Bulletin, vol. 31, No. 12, May 1989, p. 386.
IBM Technical Disclosure Bulletin, vol. 31, No. 12, May 1989 pp. 381-383, "Converter From Visual Curves to Auditory Cues For Blind Persons".
Comerford, "Seeing Eye Mouse", IBM Tech. Disc. Bulletin vol. 28, No. 3, Aug. 1985, pp. 1343-1344.
Drumm, et al, "Audible Cursor Positioning and Pixel Status Identification Mechanism", IBM Tech. Disc. Bull. vol. 27, No. 4B, Sep. 1984, p. 2528.
Lazzaro, "Windows of Vulnerability", Jun., 1991, Byte Magazine p. 416.
Golding, et al, "Audio Response Terminal", IBM Tech. Disc. Bulletin, vol. 26, No. 10B, Mar., 1984, pp. 5633-5636.
Barnett, et al, "Speech Output Display Terminal", IBM Tech. Disc. Bulletin, vol. 26, No. 10A, Mar. 1984, pp. 4950-4951.

*Primary Examiner*—Donald J. Yusko
*Assistant Examiner*—Edwin C. Holloway, III
*Attorney, Agent, or Firm*—Jonathan E. Jobe, Jr.; Andrew J. Dillon

[57] ABSTRACT

Disclosed is a computer audio interface having stereo and filtered sound effects to enable blind users to operate a graphical user interface. Stereo balance and incremental filtering are used along separate axes to guide a blind or visually impaired user within an area of a graphical user interface, particularly the client area of a window. As the pointer approaches the left boundary of the client area, the sounds representing the client area come more and more exclusively from the left audio channel. Likewise, when approaching the right boundary, the sound shifts to the right channel. Additionally, as the pointer is moved toward the top of the window client area, the pitch of the sound increases in stepwise fashion.

10 Claims, 2 Drawing Sheets

COMPUTER USER INTERFACE WITH STEREO AND FILTERED SOUND EFFECTS

The application is a continuation of application Ser. No. 07/746,840, filed Aug. 19, 1991 now abandoned.

BACKGROUND OF THE INVENTION

1. Field of the Invention

The present invention relates generally to computer system user interfaces and more particularly to a computer system user interface having stereo and filtered sound effects for enabling blind or visually impaired users to operate a computer system with a graphical user interface.

2. Description of the Prior Art

In recent years, there has been a move among computer application software developers toward graphical user interfaces. In graphical user interfaces, objects are presented for users to manipulate in ways that are similar to the way that they are manipulated in the real work place. Objects, such as file cabinets, folders, documents, and printers, are displayed on the screen as icons. Users manipulate these objects with a mouse to perform desired operations. For example, to file a document in a folder that is located in a file cabinet in the real work place, the user opens the file cabinet, locates and opens the correct folder, and puts the document inside. In the electronic work place of the graphical user interface, the user performs a similar process. The user opens the file cabinet icon, locates the correct folder icon, and drops the document icon in the folder. Because this is an electronic environment, users do not have to open the folder to put the document in it. However, users have been able to use their knowledge of a real work place to perform this operation.

Normally sighted persons find graphical user interfaces intuitive and easy to work with. However, except for an occasional "beep" or "bong", graphical user interfaces are virtually silent and the vast majority of the information they provide to the user is visual. Thus, graphical user interfaces are essentially not usable by blind or severely visually impaired people.

Blind and visually impaired computer users now benefit from many forms of adaptive technology, including speech synthesis, large-print processing, braille desktop publishing, and voice recognition. However, presently, almost none of the foregoing tools is adapted for use with graphical user interfaces. It has been suggested that programmers could write software with built-in voice labels for icons. Lazzaro, *Windows of Vulnerability*, Byte Magazine, June 1991, page 416. Various synthetic or recorded speech solutions for making computer display screen contents available to blind persons have been suggested, for example in Golding, et. al., IBM Technical Disclosure Bulletin, Vol. 26, No. 10B, pages 5633–5636 (March 1984), and Barnett, et. al., IBM Technical Disclosure Bulletin, Vol. 26, No. 10A, pages 4950–4951 (March 1984). Additionally, there have been suggested systems that include a mouse with a braille transducer so that a blind user may read text and obtain certain tactile position feedback from the mouse. Comerford, IBM Technical Disclosure Bulletin, Vol. 28, No. 3, page 1343 (August 1985), Affinito, et. al., IBM Technical Disclosure Bulletin, Vol. 31, No. 12, page 386 (May 1989). However, while announcing various text items, either audibly or by means of a braille transducer in the mouse, may provide some information to blind user, it does not enable the user to navigate about and locate objects on the computer display screen.

There has been suggested an audible cursor positioning and pixel (picture element) status identification mechanism to help a user of an interactive computer graphics system locate data by using aural feedback to enhance visual feedback. As the cursor is stepped across the screen, an audible click is generated that varies in tone corresponding in tone to the current status of each pixel encountered. With this combination in audible and visual cursor feedback, it becomes a simple task to identify the desired line by noting the change in tone as the cursor moves. For color display applications, each color is represented by a distinct tone so any single pixel may be distinguished from the surrounding pixels of a different color. It has been suggested that this system is especially helpful for visually impaired or learning disabled users. Drumm, et. al., IBM Technical Disclosure Bulletin, Vol. 27, No. 48, page 2528 (September 1984). However, the foregoing disclosure does not suggest a means of enabling a blind user to navigate about or locate objects on the computer display screen.

SUMMARY OF THE INVENTION

In the present invention, a stereo balance effect is used to convey information about the position of the pointer in the left/right or X direction relative to the limits of the client area of the current window. The system of the present invention includes laterally spaced apart audio transducers, which may be speakers or stereo headphones. As the pointer approaches the left boundary of the client area, the sounds representing the client area come more and more exclusively from the left audio channel. Likewise, approaching the right boundary causes the sound to shift to the right channel. Centering the pointer within the window causes equal sound output from both stereo channels. This audio effect is dramatic and effective. It also allows the user to sense quickly the size of the window. If the user hears a large balance shift for relatively little mouse movement, the user can sense that the window is narrow. Additionally, in the present invention, a different effect is implemented to communicate relative position in the top/bottom or Y axis of the window client area. In this aspect of the invention, the frequency of the sounds representing the client is a function of the top/bottom or Y position of the pointer within the window client area. Preferably, the frequency is changed in a fixed number of discrete steps, which allow the user to count them and better ascertain top/bottom or Y position. In the preferred embodiment, the frequency is increased as the pointer moves from the bottom to the top of the client area, which follows the intuitive metaphor of high pitched sounds corresponding to a high position.

A particular problem that blind or visually impaired users have in operating graphical user interfaces is navigating in windows. Windows include a client area that is populated with text and or icons. Sighted users can find objects within windows at a glance and move the pointer to them almost without thinking. However, a blind or visually impaired user, even if provided with text to speech or other audio identification of the objects can find such objects only through trial and error or random searching. Moreover, it is very difficult for a blind or visually impaired user, after having found and identified all of the objects in the window, to navigate back to a desired object.

DESCRIPTION OF THE PREFERRED EMBODIMENT

Figure 1:
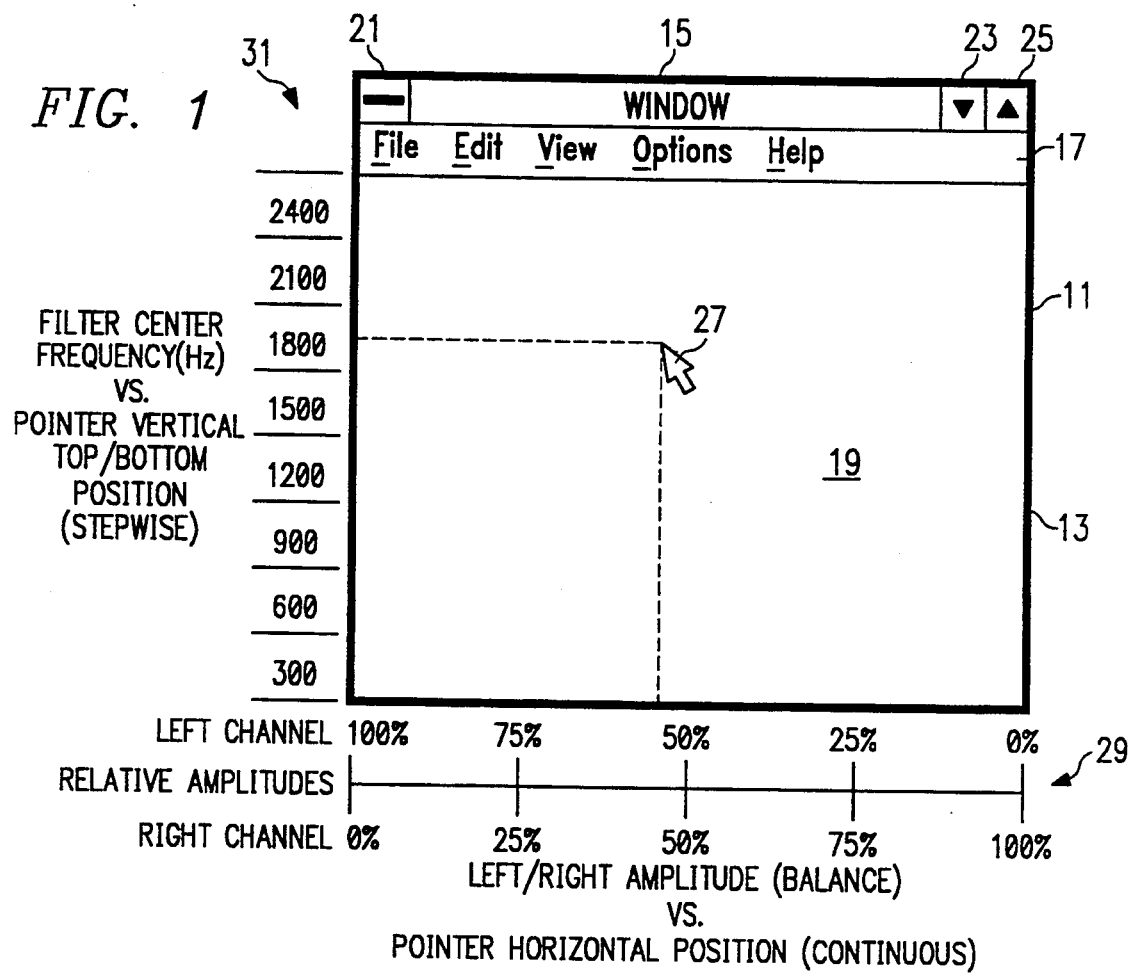
FIG. 1 is a pictorial view of a window with relative amplitude and frequency scales added to aid in understanding the invention.

Referring now to the drawings, and first to FIG. 1, a window is designated generally by the numeral 11. Window 11 is displayed on a computer system display screen, as is well known to those skilled in the art. Window 11 includes a window border 13, a title bar 15, an action bar 17, and a client area 19. Title bar 15 includes, in addition to the title of the window, a system menu icon 21, and window-sizing icons 23 and 25. System menu icon 21 allows a user to display a pull-down menu containing the actions that the user can perform on the window. Window-sizing icon 23 provides a fast way to use a mouse or other pointing device to minimize the window, by reducing it to an icon. Conversely, window-sizing icon 25 provides a fast way for the user to maximize the window to fill the entire screen.

Action bar 17 contains a list of the actions of an application. The user can cause the system to display a pull-down menu under each item in action bar 17.

Client area 19 comprises the remainder of window 11. Client area 19 is the focus of the users attention and it is where the user is presented with the object or objects upon which the user wishes to work. As those skilled in the art and those familiar windows will recognize, the window client area is normally populated with text and/or icons. However, for purposes of clarity and illustration, client area 19 is shown to be empty.

A pointer 27 is shown within client area 19. Pointer 27 is moveable about the screen by means of a mouse (not shown) or other pointing device. The user can move pointer 27 to various objects to select, open, or directly manipulate them. People with normal vision can move pointer 27 about the screen and find such items as system menu icon 21 or maximize icon 25 easily. However, as can be imagined, blind or severely visually impaired people would have a very difficult time locating items in a window. Accordingly, in the present invention, sound effects are provided to give the user audible feedback about the position of pointer 27.

In FIG. 1, a left/right amplitude scale designated generally by the numeral 29 is depicted along the bottom margin of window 11. Scale 29 is provided only for ease of explanation and understanding of the invention and is not actually displayed on the screen. In the present invention, an audible tone is generated from a pair of laterally spaced apart transducers. The transducers may be either speakers positioned on opposite sides of the workstation or headphones worn by the user. Scale 29 shows graphically the relative left/right amplitudes or balance of the left and right channels as a function of the horizontal or left/right position of the pointer. Thus, when the pointer is positioned on the vertical center line of client area 19, the amplitudes of the left and right channels are equal to each other and are balanced. As pointer 27 is moved toward the left, the left channel amplitude increases while the right channel amplitude decreases. Similarly, as the user moves pointer 27 toward the right, right channel amplitude increases while left channel amplitude deceases. The stereo effect provided by the present invention enables the user almost to "see" the left/right position of the pointer.

As the user moves pointer 27 vertically or in the top/bottom axis of window 11, the pitch or frequency of the tone varies in stepwise fashion, as depicted by the scale 31 displayed along the left hand margin of window 11. Scale 31 shows graphically the stepwise arrangement of frequencies as a function of the top/bottom position of the pointer. In the preferred embodiment, eight distinct frequencies are provided at 300 hertz intervals. The stepwise frequency function allows the user to count the steps and thereby know how close pointer 27 is to the top or bottom of window client area 19. The frequency or pitch variation enables the user to visualize accurately the top/bottom position of pointer 27. Again, scale 31 is illustrated only for ease of explanation and understanding of the invention, it is not actually displayed on the screen.

With the present invention, the user can tell easily where pointer 27 is in window client area 19. By convention, title bar 15 and action bar 17 are always located at the top of window 11. The choices in action bar 17 are always listed left to right starting near the upper left hand corner of window 11. Preferably, the choices of action bar 17 are announced by text-to-speech or recorded speech. Thus, the user can easily find the upper left hand corner of client area 19 and thereby find action bar 17 or system menu icon 21. Similarly, minimize icon 23 and maximize icon 25 are always located in the upper right hand corner of window 11, which the user can find quickly and easily.

Figure 2:
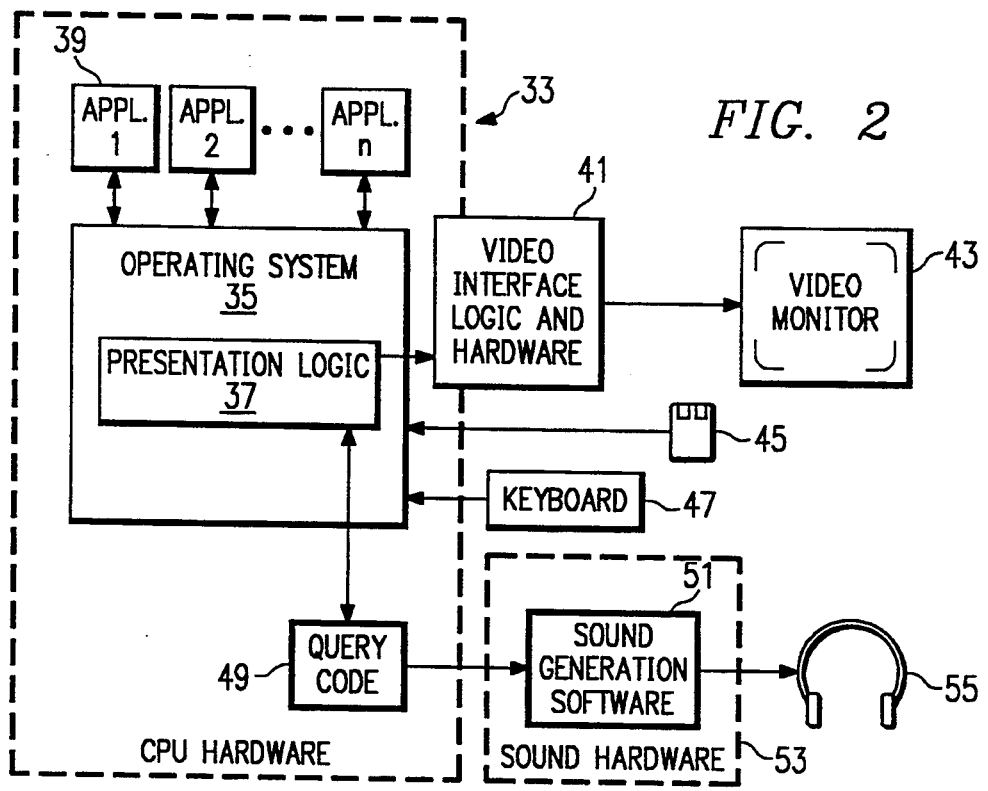
FIG. 2 is a block diagram showing a preferred system of the present invention.

Turning now to FIG. 2, there is shown a block diagram of the system of the present invention. The CPU hardware is contained in dashed rectangle 33. Running on CPU hardware 33 is an operating system 35 which includes presentation logic 37. A plurality of applications 39 are shown running on operating system 35. Video interface logic and hardware 41 receive information from presentation logic 37, which is displayed on a video monitor 43. A mouse 45 and a keyboard 47 provide user input to the system.

The system includes query code 49 which receives information from presentation logic 37 including type of window, position and size of window, and current pointer position. Query code 49 provides information to sound generation software 51 and hardware 53. The output from sound generation hardware 53 is provided to stereo headphones 55 or speakers.

Figure 3:
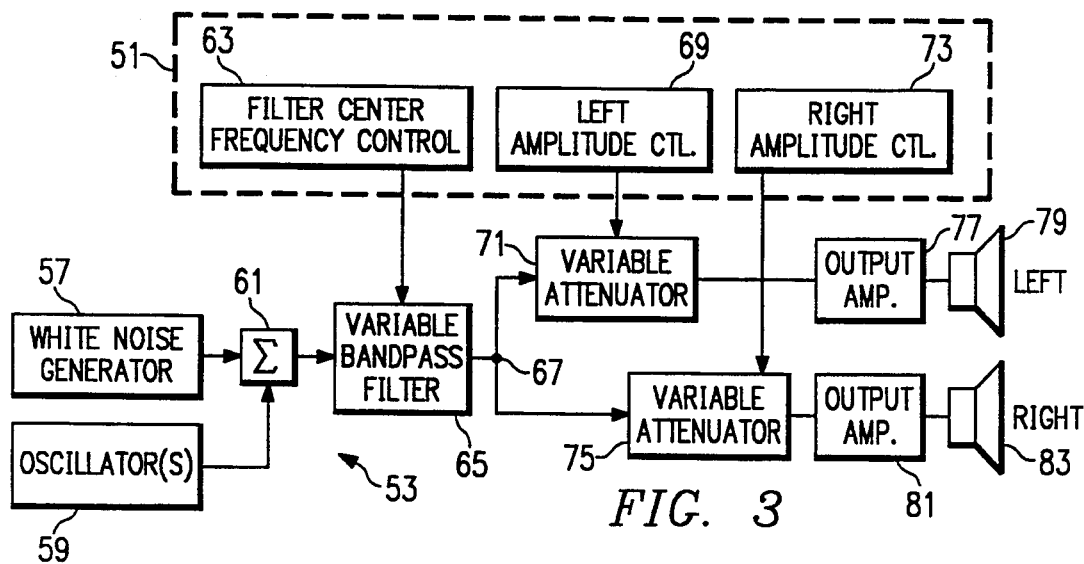
FIG. 3 is a block diagram showing a preferred implementation of the sound generator of the present invention.

Referring now to FIG. 3, there is shown a block diagram of the sound generation software and hardware of the system of the present invention. Sound generation hardware 53 includes a white noise generator 57 and oscillator or oscillators 59. White noise generator 57 generates white noise, which sounds like a hiss. White noise is actually a mixture of different tones or frequencies in the way that white light is a mixture of colored light. Oscillators 59 add certain frequency components to the white noise generated by white noise generator 57 at a summing circuit 61.

The sound generation software outputs include a filter center frequency control 63, which operates a variable bandpass filter 65. Variable bandpass filter 65 filters out frequency components above and below the filter center frequency and outputs an audio signal having a relatively narrow band of frequencies. The audio output of variable bandpass filter 65 is perceived by a listener as either a relatively high pitched hiss or relatively low pitched hiss depending on the filter center frequency.

The output from variable bandpass filter 65 is split at 67 into left and right channels. A left amplitude control 69 controls a variable attenuator 71 in the left channel and a right amplitude control 73 controls a variable attenuator 75 in the right channel. The output from variable attenuator 71 is amplified and an output amplifier 77 and the audio signal is produced at left speaker 79. Similarly, the output from variable attenuator 75 is amplified at an output amplifier 81 and produced as an audio signal at right speaker 83.

Figure 4:
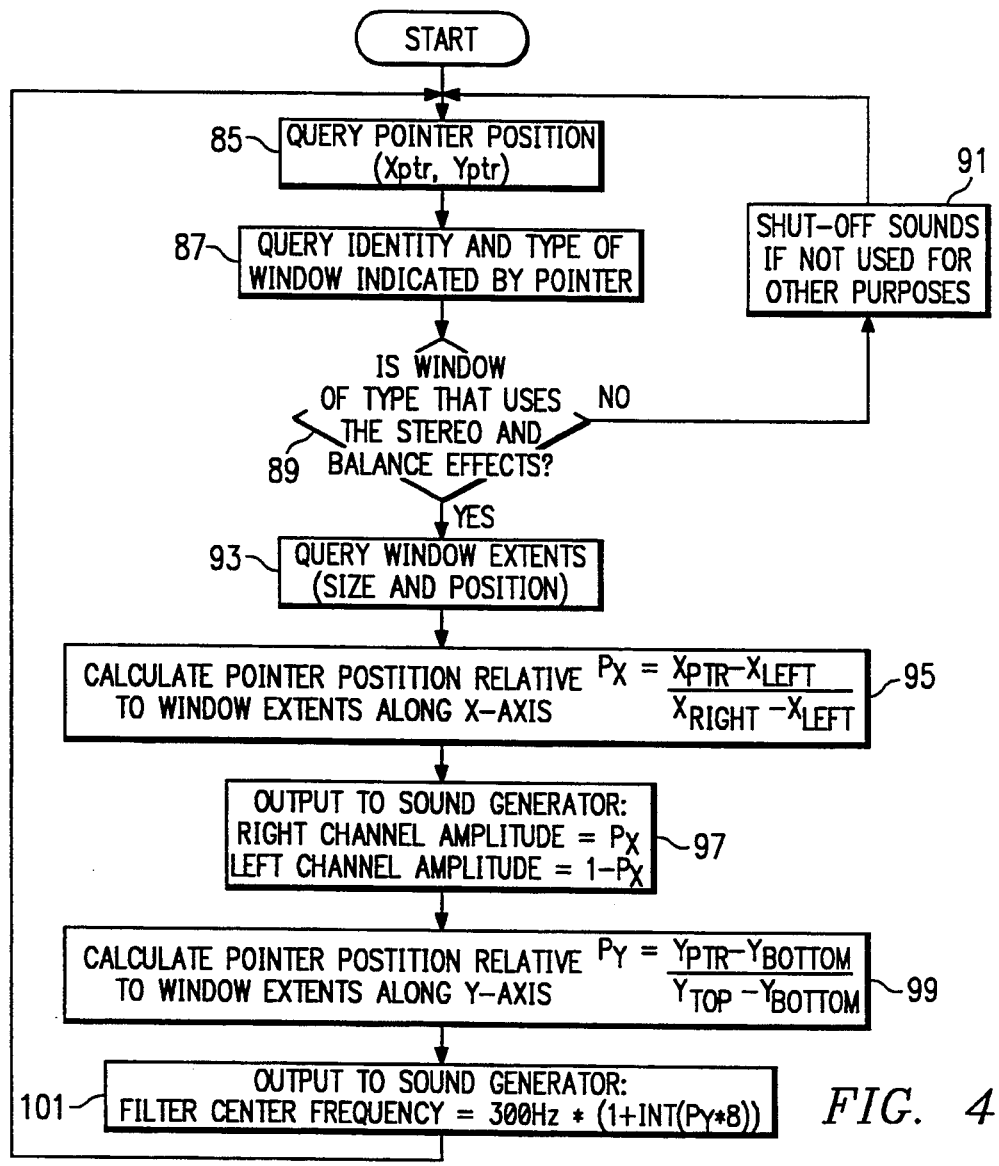
FIG. 4 is a flowchart of a preferred software implementation of the present invention.

Referring now to FIG. 4, there is shown a flowchart of a preferred embodiment of the query code of the present invention. First, the pointer position (Xptr, Yptr) is queried at block 85. Then, at block 87, the identity and type of the window indicated by the pointer is queried. Then, the system tests at decision block 89 whether the window indicated by the pointer is of the type that uses stereo and balanced sound effects. In the present invention, window is defined broadly to include not only application windows as described above, but also the background screen, message boxes, dialog boxes, pull-down menus, pop-up menus, and the like. In the preferred embodiment of the invention, the stereo and balanced sound effects are produced only when the pointer is in the client area of an application window. Thus, if the pointer is somewhere other than the client area of an application window, the sounds are shut off at block 91 if they are not used for some other purpose and the system returns again to query pointer position at block 85.

If the pointer is in the client area of an application window, the system queries the windows extents at block 93. This amounts to determining the left/right limits of the window client area, which are designated Xleft and Xright, respectively, and the top/bottom limits of the window client area, which are designated Ytop and Ybottom, respectively. Then, at block 95, the system calculates the pointer position relative to the window extents along the X axis by the formula:

$$Px = \frac{Xptr - Xleft}{Xright - Xleft}$$

Then, at block 97, Px, which is the right channel amplitude, is output to the right amplitude control and 1-Px, which is the left channel amplitude, is output to the left amplitude control. Next, at block 99, the system calculates the pointer position relative to the window extents along the Y axis by the formula:

$$Py = \frac{Yptr - Ybottom}{Ytop - Ybottom}$$

Then, at block 101, the system uses Py to calculate the filter center frequency by the formula 300 hertz * 9 (1+int(Py*8)), which is output to the sound generator. The formula of block 101 produces a set of stepwise frequencies from 300 hertz to 2,400 hertz, as illustrated in FIG. 1. After the filter center frequency has been output at block 101, the system returns to block 85 and again queries pointer position.

From the foregoing it may be seen that the system of the present invention provides a blind or visually impaired user with audio information sufficient to enable the user to locate objects in a window. The present invention may also find use among normally sighted users who desire additional sensory input.

While the invention has been particularly shown and described with reference to a preferred embodiment, those skilled in the art will understand that various changes may be made in form and detail without departing from the spirit and scope of the invention.

What I claim is:

1. A method of providing a user of a computer system which includes a display screen for displaying at least one window on a portion thereof, said at least One window including a title bar and a client area, a pointing device for manually positioning a pointer on said display screen, and a pair of spaced apart speakers, with audio information regarding the position of the pointer on the display screen which comprises the steps of:

monitoring the position of the pointer on said display screen; and generating a distinctive audio signal from each of said speakers only when said pointer is positioned in a client area of a window, the relative amplitudes of said audio signals being proportional to the relative left/right position of said pointer in said client area of said window.

2. The method as claimed in claim 1, wherein the frequency of said distinctive audio signal is proportional to the relative top/bottom position of said pointer in said client area of said window.

3. The method as claimed in claim 1, including the step of:

discontinuing said distinctive audio signal whenever said pointer is positioned outside a client area of a window.

4. The method as claimed in claim 1, wherein said window includes a left boundary and a right boundary of said client area of said window, and said generating step includes the steps of:

determining the positions of said left and right boundaries on said display screen;

calculating the position of said pointer relative to said left and right boundaries; and controlling the amplitude of said distinctive audio signal generated by each of said speakers such that the relative amplitudes of said audio signals are equal to the position of said pointer relative to said left and right boundaries.

5. A method of providing a user of a computer system which includes a display screen for displaying at least one window on a portion thereof, said at least one window including a title bar and a client area, and a pointing device for manually positioning a pointer on said display screen, with audio information regarding the position of the pointer on the display screen, which comprises the steps of:

monitoring the position of the pointer on said display screen; and generating a first distinctive audio signal only when said pointer is positioned in a client area of a window, wherein the frequency of said first distinctive audio signal is proportional to the relative top/bottom position of said pointer in said client area of said window.

6. The method as claimed in claim 5, wherein said first distinctive audio emanates from a position located to one side of said user and including the step of:

generating a second distinctive audio signal emanating from a position located to the opposite side of said user, said second distinctive audio signal having a frequency substantially equal to the frequency of said first audio signal.

7. The method as claimed in claim 6, wherein the relative amplitudes of said first and second distinctive audio signals are proportional to the relative right/left position of said pointer in said client area of said window.

8. The method as claimed in claim 7, wherein said first distinctive audio signal emanates from a right speaker and said second distinctive audio signal emanates from a left speaker, and the amplitude of said first distinctive audio signal increases as said pointers move toward the right in said client area of said window and the amplitude of said second distinctive audio signal increases as said pointers move toward the left in said client area of said window.

9. The method as claimed in claim 5, wherein said frequency increases in stepwise fashion as said pointer is moved toward the top of said screen.

10. The method as claimed in claim 5, including the step of:
  discontinuing said distinctive audio signal whenever said pointer is positioned outside said client area of said window.

* * * * *